(12) United States Patent
Kumar et al.

(10) Patent No.: US 11,474,268 B2
(45) Date of Patent: Oct. 18, 2022

(54) NOISE MITIGATION FOR TIME-LAPSE SURVEYS

(71) Applicant: PGS Geophysical AS, Oslo (NO)

(72) Inventors: Jyoti Kumar, Kula Lumpur (MY); Didier Lecerf, Guildford (GB)

(73) Assignee: PGS Geophysical AS, Oslo (NO)

( * ) Notice: Subject to any disclaimer, the term of this patent is extended or adjusted under 35 U.S.C. 154(b) by 181 days.

(21) Appl. No.: 16/783,973

(22) Filed: Feb. 6, 2020

(65) Prior Publication Data
US 2020/0264328 A1   Aug. 20, 2020

Related U.S. Application Data

(60) Provisional application No. 62/808,191, filed on Feb. 20, 2019.

(51) Int. Cl.
*G01V 1/30* (2006.01)

(52) U.S. Cl.
CPC .......... *G01V 1/308* (2013.01); *G01V 2210/32* (2013.01); *G01V 2210/612* (2013.01)

(58) Field of Classification Search
None
See application file for complete search history.

(56) References Cited

U.S. PATENT DOCUMENTS

| | | | | |
|---|---|---|---|---|
| 7,337,070 B2 * | 2/2008 | Lecerf | ................... | G01V 1/366 702/17 |
| 7,720,607 B2 * | 5/2010 | Lecerf | ................... | G01V 1/366 702/11 |
| 8,086,426 B2 * | 12/2011 | El Ouair | ................ | G01V 1/308 703/2 |
| 8,929,175 B2 * | 1/2015 | Ligtendag | ............ | G01V 1/3808 367/24 |
| 9,234,976 B2 | 1/2016 | Zabihi Naeini et al. | | |
| 9,864,084 B2 | 1/2018 | Poole | | |
| 10,330,809 B2 | 6/2019 | Hoeber et al. | | |
| 2014/0247693 A1 * | 9/2014 | Haacke | .................. | G01V 1/308 367/38 |

(Continued)

OTHER PUBLICATIONS

S. Campbell et al., "Optimising Reservoir Management With Improved Time-Lapse Processing on 10 Acquisition Vintages Over the Foinaven-Schiehallion-Loyal Fields," IPTC-18453-MS, Copyright 2015, International Petroleum Technology Conference, 8 pages.

*Primary Examiner* — Lina M Cordero

(57) ABSTRACT

Techniques are disclosed for reducing noise when computing time-lapse differences between two or more geophysical surveys performed over the same region. In some computer-implemented embodiments, a time-lapse difference is determined between first and second data representing the first and second surveys, respectively. Based on geometry information corresponding to the second survey, first estimated data is generated representing how the first data would have looked if the second survey geometry had been used during the first survey. A noise model is generated based on differences between the first data and the first estimated data. The time-lapse difference is then adjusted using the noise model, thereby reducing noise in the time-lapse difference caused by differences between the geometries of the first and second surveys.

20 Claims, 10 Drawing Sheets

(56) References Cited

U.S. PATENT DOCUMENTS

| | | | |
|---|---|---|---|
| 2016/0091624 A1* | 3/2016 | Haacke | G01V 1/308 702/16 |
| 2016/0109597 A1* | 4/2016 | Hoeber | G01V 1/308 702/17 |
| 2016/0320507 A1 | 11/2016 | Kashubin et al. | |
| 2018/0259662 A1 | 9/2018 | Srinivasan | |

* cited by examiner

Image from survey A

Image from survey B

Noise model A

Noise model B

Adjusted difference between surveys A and B

Comparison of portion of Fig. 3 and corresponding portion of Fig. 8A

NOISE MITIGATION FOR TIME-LAPSE SURVEYS

CROSS-REFERENCE TO RELATED APPLICATIONS

This application claims priority to U.S. Provisional Application No. 62/808,191, filed on Feb. 20, 2019, which is hereby incorporated by reference as if entirely set forth herein.

BACKGROUND

Geophysical surveys, such as seismic or electromagnetic surveys, are often used for oil and gas exploration in geological formations, which may be located below marine environments. Seismic surveys, for example, are based on the use of acoustic waves. In offshore seismic surveys, a survey vessel may tow one or more signal sources (e.g., an air gun) and a plurality of streamers along which a number of acoustic sensors (e.g., hydrophones and/or geophones) are located. Acoustic waves generated by the source(s) are transmitted into the earth's crust and then reflected back and captured at the sensors. Data collected during a marine geophysical survey is analyzed to locate hydrocarbon-bearing geological formations, and thus to determine where deposits of oil and natural gas may be located.

DETAILED DESCRIPTION

Time-lapse surveys (which may also be referred to as 4D surveys) involve surveying the same region at different times, e.g., to detect changes due to removal of resources from sub-sea formations. Typically, raw data from a geophysical survey exhibits noise from various sources. Reducing this noise may allow more accurate detection of the desired signals (e.g., signals originating from the survey sources that are reflected from a subsea formation and measured by sensors). For time-lapse surveys, differences in survey geometry for surveys performed at different times may be one source of noise.

Example Survey System

Figure 1:
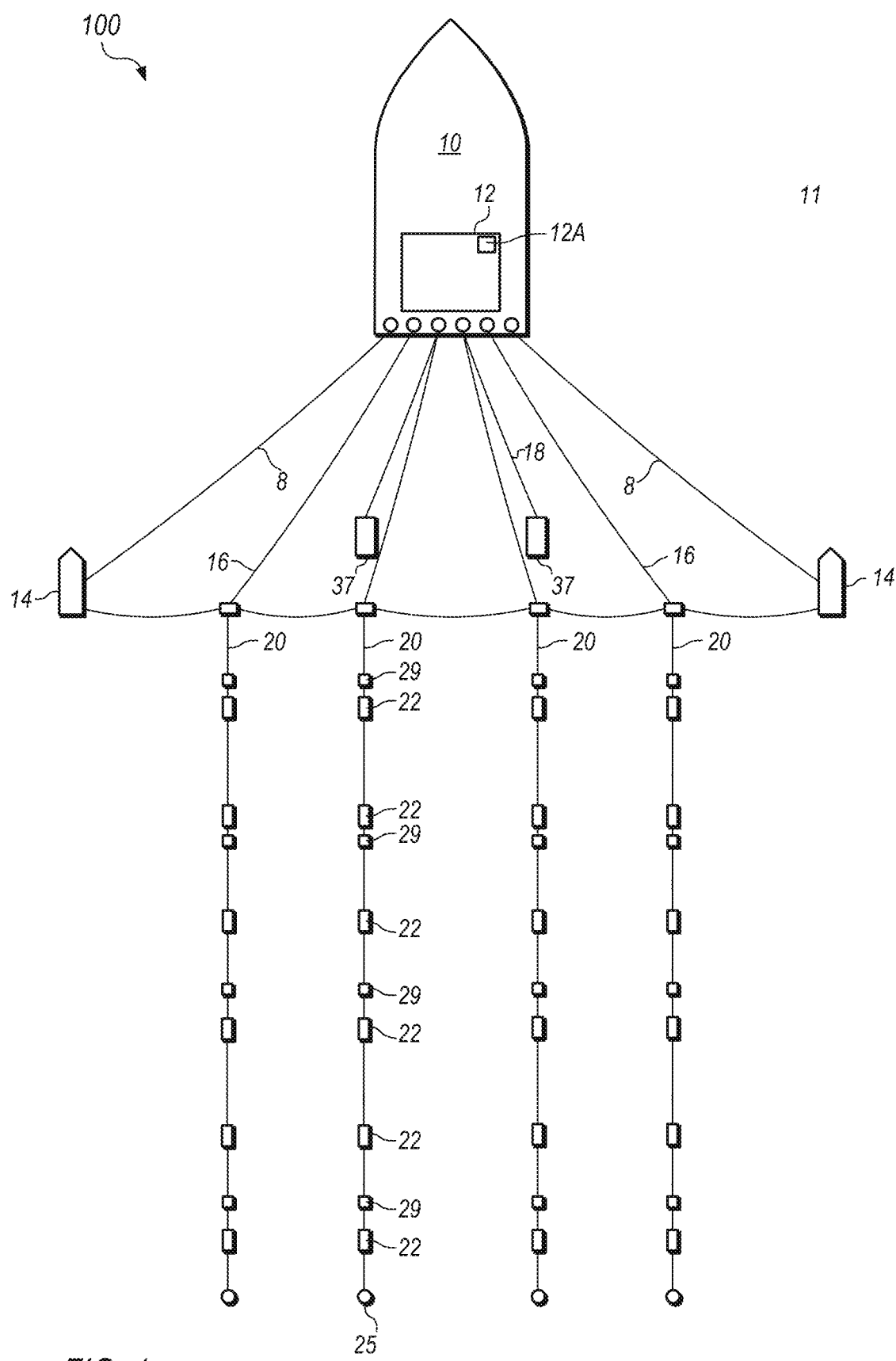
FIG. 1 is a block diagram illustrating an example geophysical survey system, according to some embodiments.

FIG. 1 is a block diagram illustrating a marine geophysical survey system 100, according to some embodiments. In various embodiments, survey system 100 is configured to acquire geophysical data corresponding to geological structures disposed below body of water 11. In the illustrated embodiment, system 100 includes survey vessel 10, which tows signal sources 37, paravanes 14, and streamers 20, along which geophysical sensors 22 are disposed. In other embodiments, at least a portion of streamers 20 may be towed by a second survey vessel (not shown), in place of or in addition to survey vessel 10. Similarly, in some embodiments, at least a portion of signal sources 37 may be towed by one or more additional survey vessels (not shown), in place of or in addition to survey vessel 10.

In additional embodiments, some or all of sensors 22 may be located in ocean-bottom nodes or in ocean-bottom cables, and vessel 10 may tow one or more sources 37 over the area where the ocean-bottom sensors are located (and may or may not also tow some number of streamers 20 while doing so). Techniques according to the present disclosure may be employed in these and other types of geophysical surveys.

In survey system 100, survey vessel 10 is shown towing two signal sources 37 using source cables 18. Note that, in some embodiments, sources may be towed in various patterns (e.g., square or circular patches) using various cable configurations for multi-dimensional data acquisition. In various embodiments, survey vessel 10 may tow any appropriate number of signal sources, including as few as none (e.g., when sources are towed by another vessel) or as many as six or more. In some embodiments, one or more of sources 37 may be impulsive sources such as air guns. In some embodiments, one or more of signal sources 37 may be vibratory signal sources that may be configured to be driven according to a given function by control equipment 12. For example, in various embodiments, one or more of signal sources 37 may be vibratory signal sources configured to be driven according to a given function or digital code. Sources 37 may also include electromagnetic sources, and some or all of sensors 22 may include corresponding electrode-type receivers.

Survey vessel 10 includes equipment, shown generally at 12 and, for convenience, collectively referred to as "control equipment." Control equipment 12 may include devices such as a data recording unit (not shown separately) for making a record of signals generated by various geophysical sensors 22 in the system 100. Control equipment 12 may also include navigation equipment (not shown separately), which may be configured to control, determine, and record the geodetic positions of: survey vessel 10, each of the plurality of geophysical sensors 22 disposed at locations on streamers 20, and signal sources 37. Geodetic position may be determined using various devices, including global navigation satellite systems such as the global positioning system (GPS), for example, and including compasses and/or acoustic positioning devices disposed at intervals along the length of streamers 20 and/or on sources 37 to more accurately determine the locations (e.g. crossline, depth and inline offset) of sensors 22 and sources 37 as they are towed. In the illustrated embodiment, survey vessel 10 includes geodetic positioning device 12A. Additional positioning devices may be placed at various locations on streamers 20. In some embodiments, control equipment 12 is configured to control sources 37, e.g., to control when the sources 37 activate, where the sources 37 are positioned, the manner in which the sources 37 are activated, etc. Note that, although control equipment 12 is shown on survey vessel 10, this embodiment is provided merely as an example and is not intended to limit the scope of the present disclosure. In various embodiments, components of control equipment 12, or the entirety of control equipment 12, may alternatively be located on a separate vessel (not shown) or at a remote location as desired.

Control equipment 12, in various embodiments, includes a computing system (an example embodiment of which is discussed below with reference to FIG. 7) configured to, inter alia, process sensor outputs from geophysical sensors 22. In other embodiments, a computing system may be located elsewhere—such as in an on-shore facility—to process geophysical data gathered by geophysical survey system 100. Such a computing system may include or be configured to access a non-transitory, computer-readable storage medium having instructions stored thereon that are executable to perform various operations described herein in order to conduct a survey or process sensor outputs generated during a survey. A computing system may include one or more processors configured to execute the program instructions to cause a system to perform various functionality described herein.

In FIG. 1, survey vessel 10 tows four streamers 20 using lead-in cables 16. In other embodiments, however, survey vessel 10 may tow any appropriate number of streamers, including as few as none (e.g., when streamers are towed by another vessel) or as many as 26 or more. In further embodiments, ocean-bottom nodes or cables containing sensors 22 may be employed in addition to or in lieu of streamers 20. Geophysical sensors 22 may include one or more of various types of geophysical sensors. Examples include hydrophones and/or geophones in some embodiments. Non-limiting examples of such geophysical sensors may include particle motion responsive seismic sensors such as geophones and accelerometers, pressure responsive seismic sensors such as hydrophones, pressure-time-gradient responsive seismic sensors, electrodes, magnetometers, temperature sensors, or any suitable combination of the foregoing. In various implementations of the disclosure, geophysical sensors 22 may measure, for example, seismic field energy indicative of the response of various structures in the Earth's subsurface formation below the bottom of body of water 11 to energy imparted into the subsurface formation by one or more of signal sources 37. Seismic energy, for example, may originate from signal sources 37 deployed in body of water 11 and towed by survey vessel 10.

In various embodiments, streamers 20 may include any of various appropriate modules in addition to geophysical sensors 22. In geophysical survey systems that include a plurality of laterally spaced-apart streamers, such as system 100, streamers 20 are typically coupled to towing equipment that secures the forward end of each of streamers 20 at a selected lateral position with respect to adjacent streamers and with respect to survey vessel 10. For example, as shown in FIG. 1, the towing equipment may include two paravanes 14 coupled to survey vessel 10 via paravane tow ropes 8. In the illustrated embodiment, paravanes 14 are the outermost components in the streamer spread and may be used to provide lateral streamer separation. In some embodiments, survey vessel 10 may be configured to tow different streamers 20 at different depths and/or different lateral displacements from a centerline of survey vessel 10. Streamers 20 may also be of different lengths relative to one another. In FIG. 1, streamers 20 further include birds 29, which are steering devices configured to maintain streamers 20 in a desired position (e.g., at a specified depth and/or lateral displacement). Similarly, steering devices may be used to facilitate positioning of sources 37. In some embodiments, survey vessel 10 may be configured to tow streamers 20 using various geometries such as different feather angles, depth profiles, etc. In some embodiments, streamers 20 may include multiple geodetic positioning devices (not shown). In some embodiments, streamers 20 may include tail buoys 25.

Techniques according to this disclosure may find application in these and other types of survey environments, including on-shore survey environments.

Example Noise in Time-Lapse Survey Data

Figure 4:
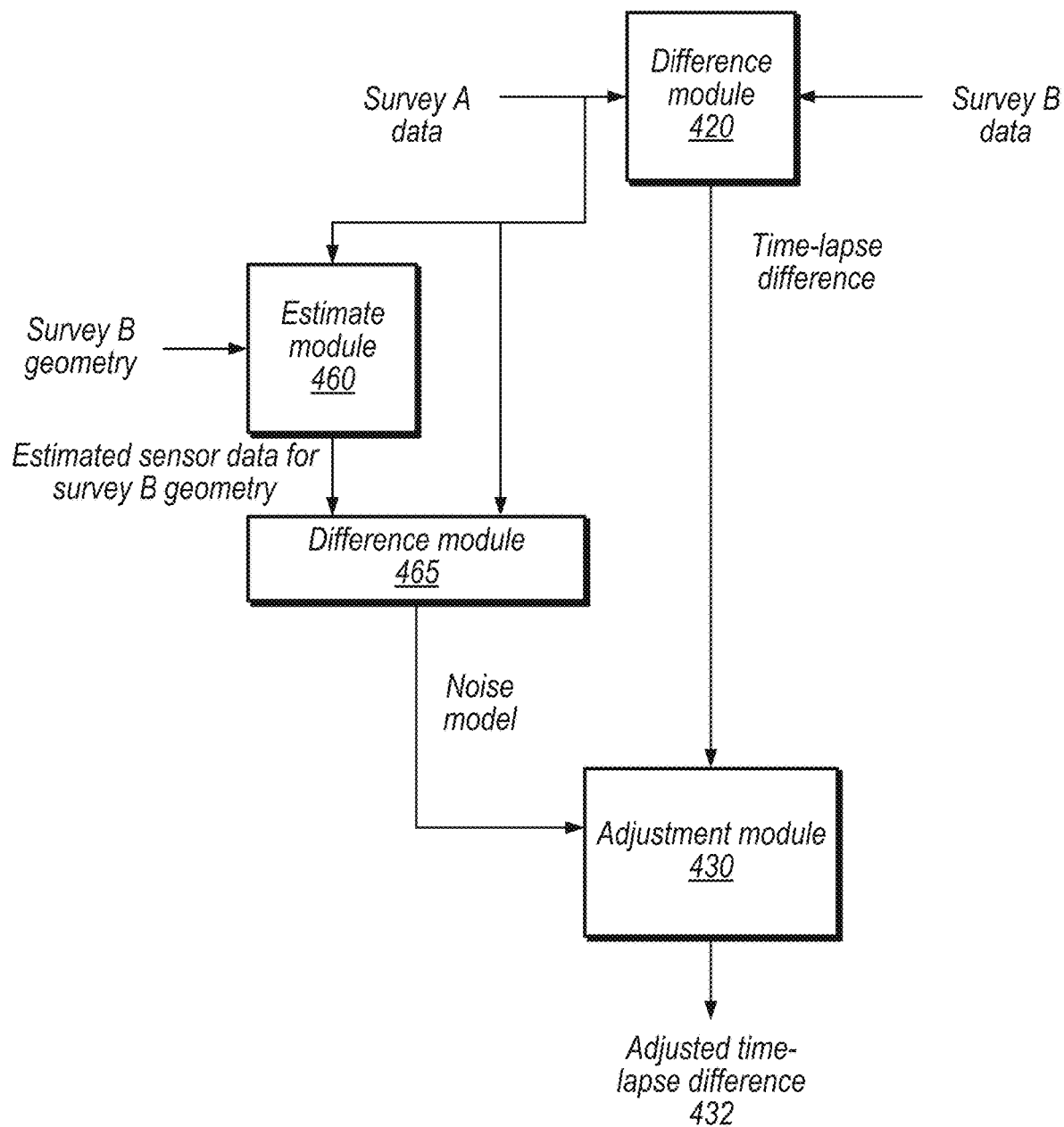
FIG. 4 is a block diagram illustrating an example system configured to reduce noise in time-lapse difference measurements, according to some embodiments.
Figure 5:
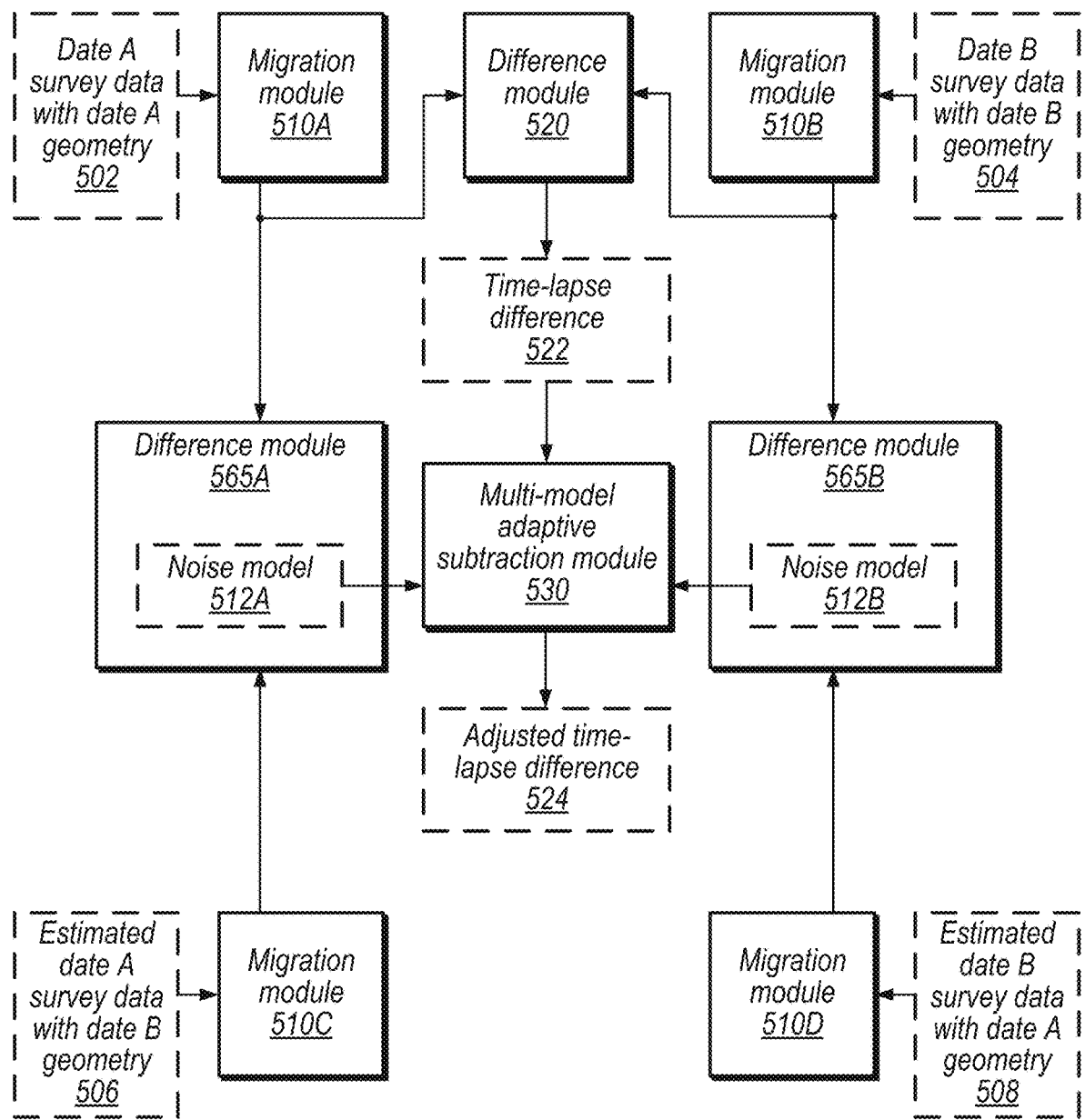
FIG. 5 is a block diagram illustrating an example system configured to reduce noise in time-lapse difference measurements using multi-model adaptive subtraction, according to some embodiments.
Figure 6:
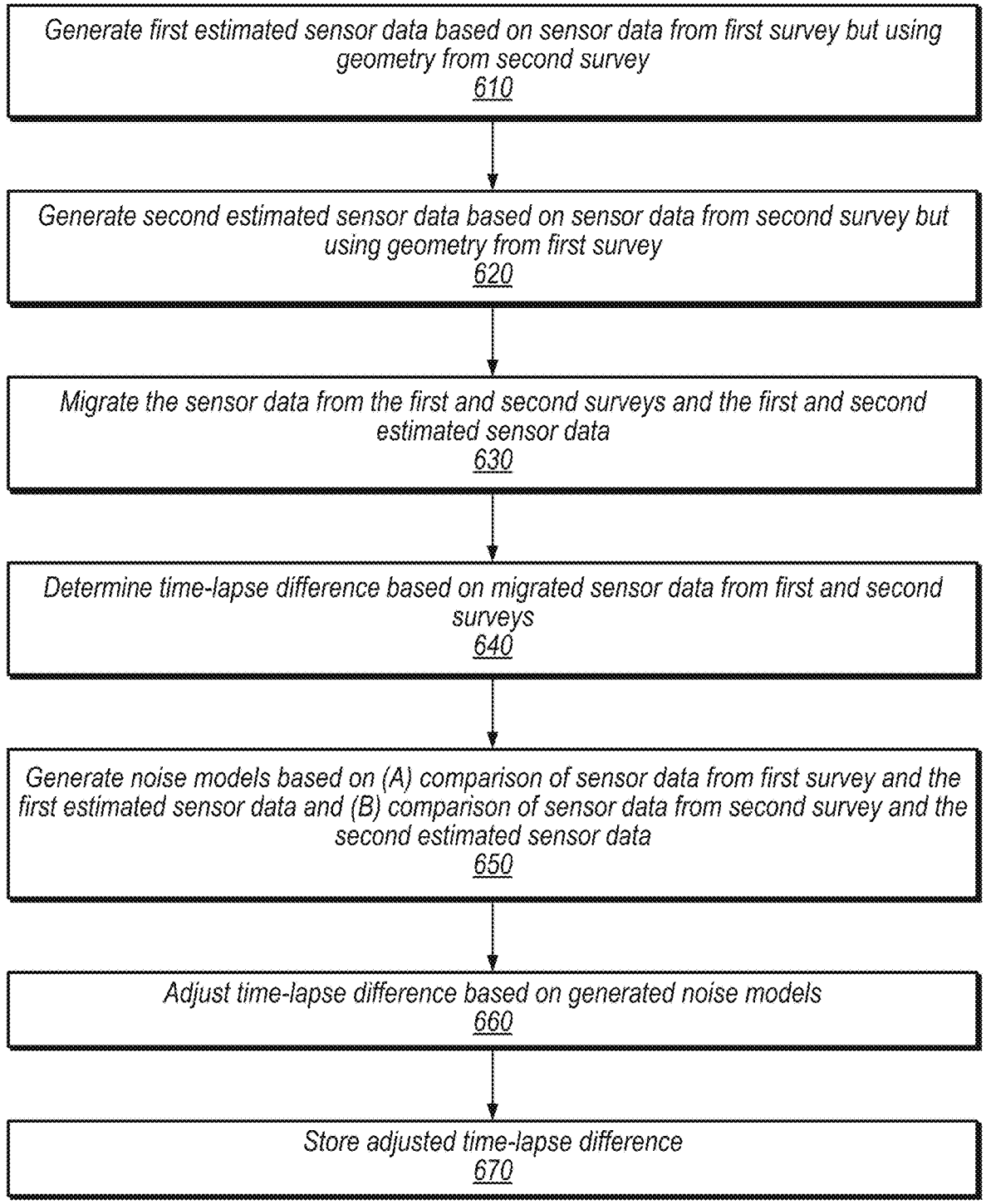
FIG. 6 is a flow diagram illustrating a detailed example method for reducing noise in time-lapse difference measurements, according to some embodiments.
Figure 7A:
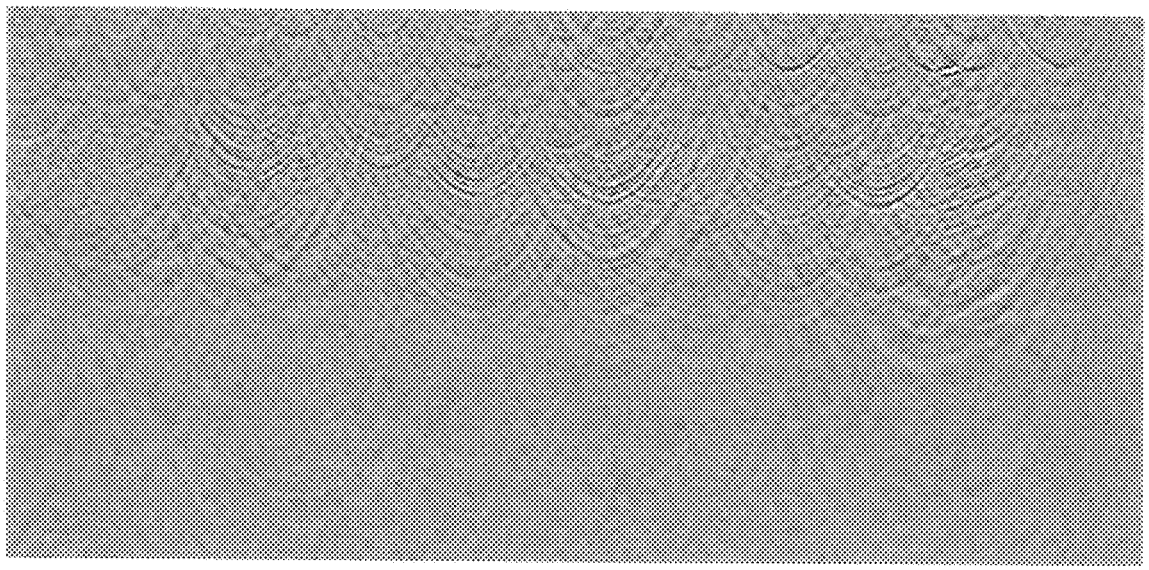
FIGS. 7A-7B are diagrams illustrating example noise models generated based on differences between actual survey measurements and estimated survey measurements using array geometry from another survey, according to some embodiments.
Figure 7B:
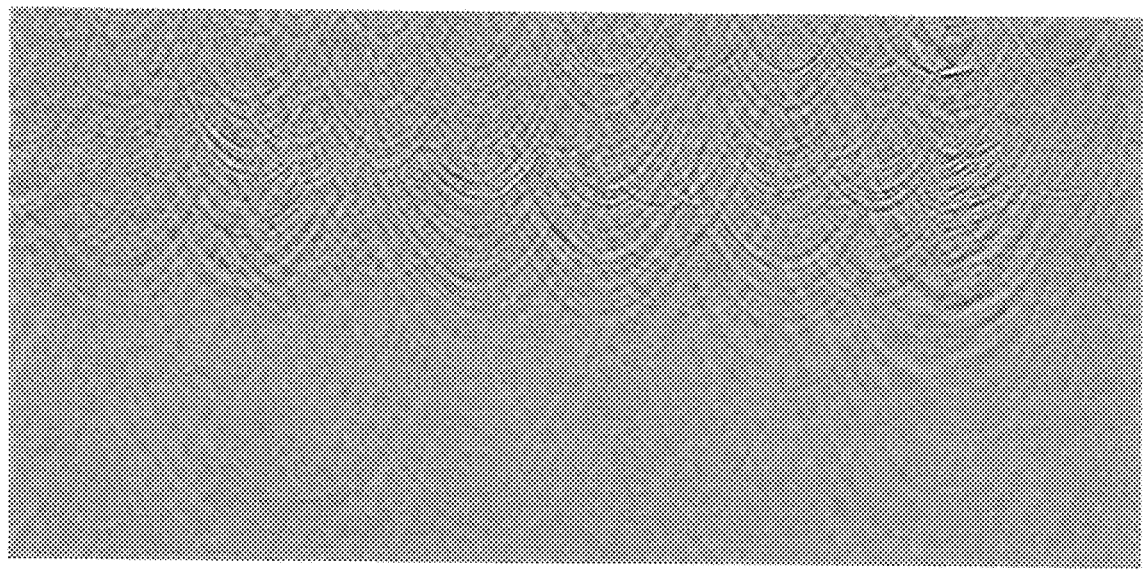
Figure 8A:
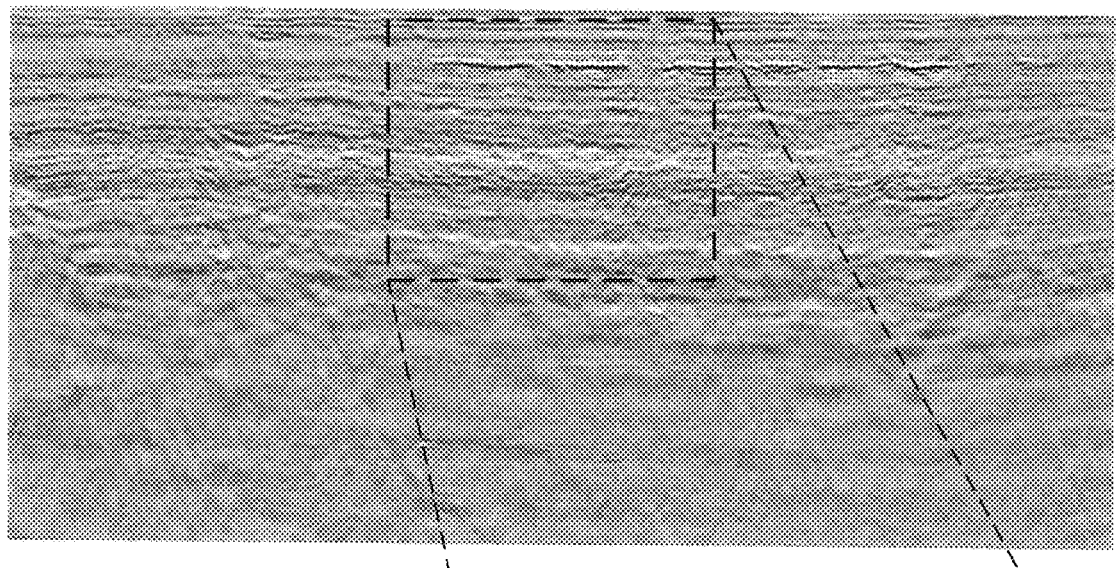
FIGS. 8A-8B are diagrams illustrating adjusted time-lapse difference measurements that exhibit reduced noise relative to the time-lapse difference shown in FIG. 3.
Figure 8B:
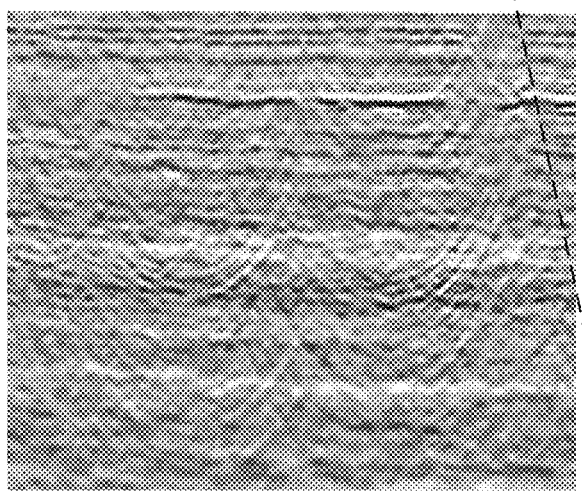
Figure 8B:
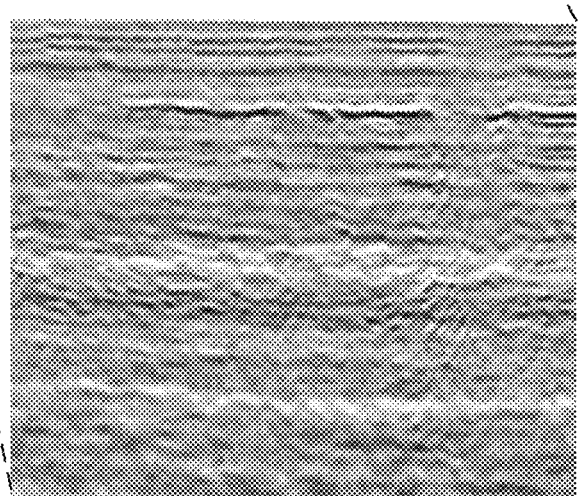

The following disclosure presents techniques for reducing noise in computed time-lapse differences between geophysical surveys, particularly noise caused by differences in survey geometry. (The phrase "time-lapse difference" as used herein simply refers to differences between the results of two or more surveys that are performed over the same survey region at different times.) Example survey images and a time-lapse difference that exhibits noise are discussed with reference to FIGS. 2A-3. FIGS. 4-6 show systems and techniques for reducing noise, while FIGS. 7A-7B show generated noise models. FIGS. 8A-8B show an adjusted time-lapse difference generated according to the disclosed techniques, which exhibits reduced noise effects.

Figure 2A:
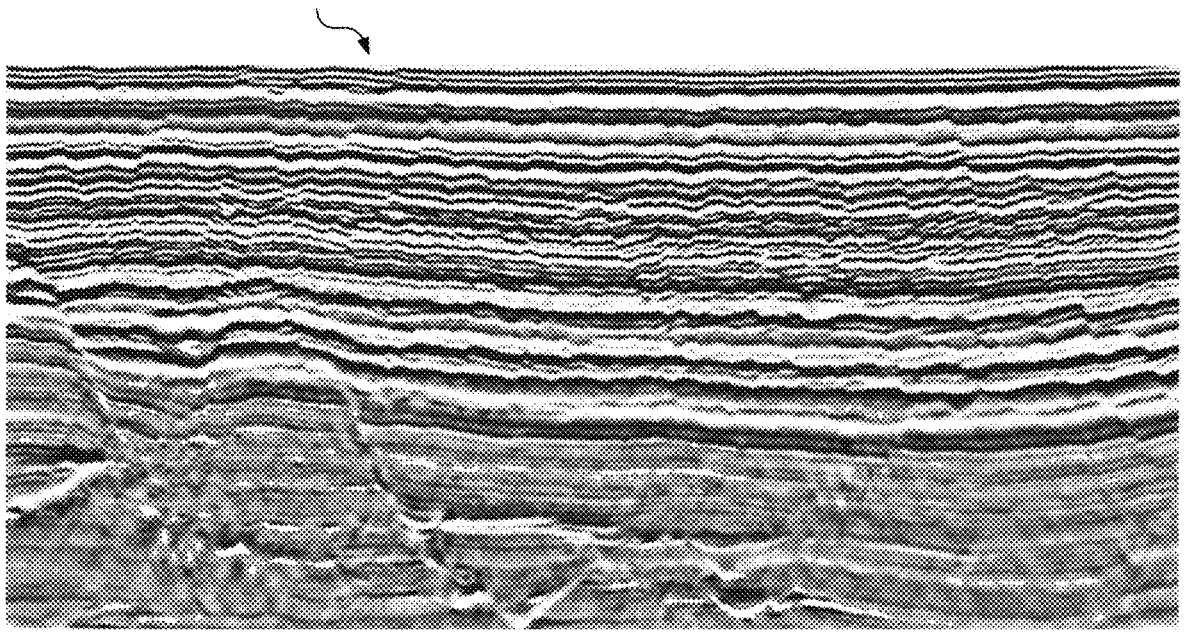
FIGS. 2A-2B are diagrams illustrating example survey images of the same area that are generated based on surveys performed at different times.
Figure 2B:
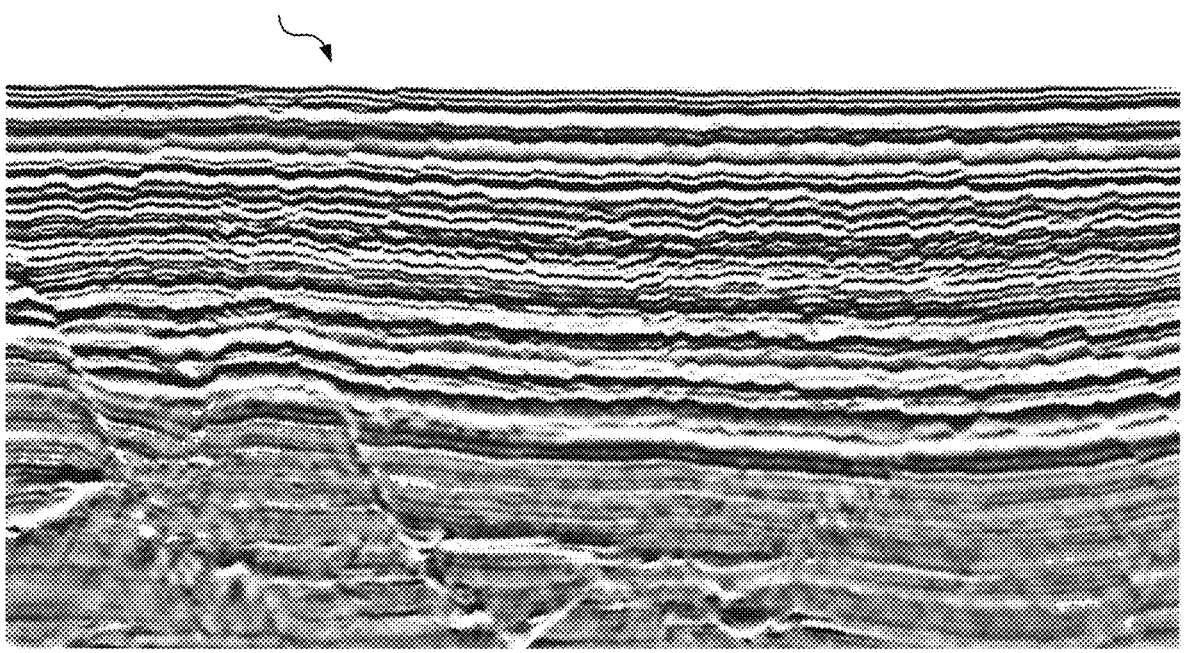

FIGS. 2A-2B illustrate example side-view images from two different surveys (survey A and survey B). In this example, survey B occurred over the same survey region as survey A, but at a later date. Both images show similar subsea formations, e.g., where the darker areas correspond to more reflective substances. As is well-understood in the art of seismic surveying, various techniques may be used to generate images of sub-sea formations such as those shown. One example includes generating common mid-point (CMP) gathers and stacking over an offset axis. A system may perform various known migration and further processing operations to generate such an image.

Figure 3:
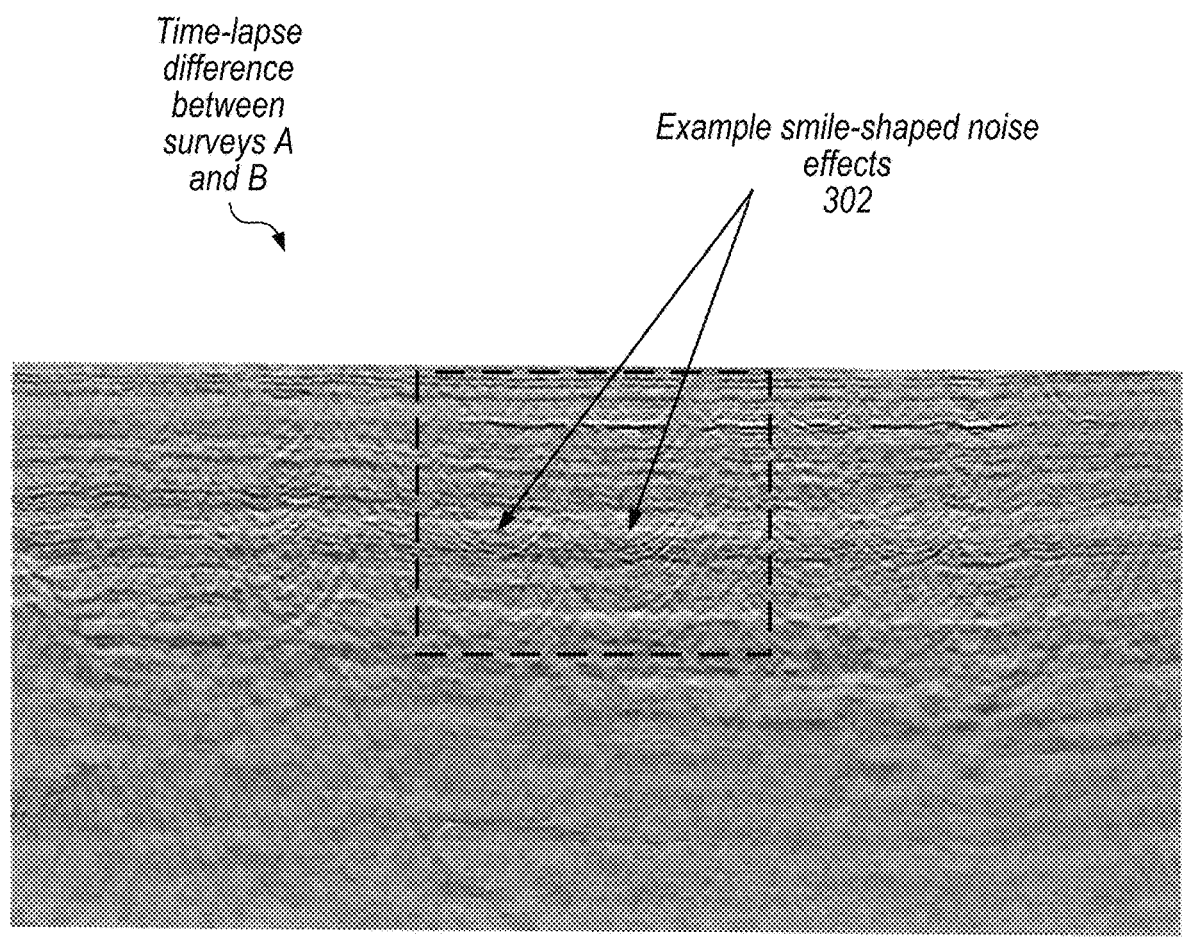
FIG. 3 is a diagram illustrating example noise in time-lapse difference measurements between two surveys.

FIG. 3 illustrates an example time-lapse difference between surveys A and B. This image may reflect changes in subsea formations between the two surveys. Note that, while the time-lapse is shown in image form in FIG. 3 as the difference in images for surveys A and B, time-lapse differences may be represented in various formats, e.g., as gathers, using pre- or post-migration data, etc.

In the illustrated example, the time-lapse difference exhibits smile-shaped noise effects 302. This type of noise may also be referred to as migration smiles or migration noise. One source of these effects may be differences in geometry between surveys A and B. As used herein, the phrase "survey geometry" or simply "geometry" refers generally to the positions and types of the equipment used to perform a survey. Note that, even during a single survey, the geometry at different times during the survey may vary, but the locations and types of the survey elements may be recorded during the performance of the survey so that data representing the geometry of the survey can be ascertained at a later date along with, or in addition to, data representing sensor measurements gathered during the survey. Note that the portion of FIG. 3 in the dashed box is expanded in FIG.

8B to more clearly illustrate reduction in the smile-shaped effects after application of example techniques disclosed herein.

It is usually the case that the geometry of a second survey, performed at a later date over the same area as an earlier first survey, will differ to some degree from the geometry of the first survey despite concerted efforts to keep the geometries identical. More particularly, one or more survey elements (e.g. sources or sensors) may be in a first position while transiting a particular portion of the survey region during the first survey, but the corresponding survey element may be in a different position while transiting the same portion of the survey region during the second, later survey. For example, due to currents, weather conditions, equipment wear, replaced equipment, etc., the survey sources may be in slightly different positions when emitting signals during the later survey, or the survey sensors may be in slightly different positions (crossline, inline offset and/or depth) during the later survey, when transiting over the same portion of the survey region that is the subject of both surveys. The differences in the two geometries can result in noise that appears in a computed time-lapse difference between the two surveys.

The following disclosure provides techniques for reducing this type of noise. In various embodiments, the techniques may advantageously allow more accurate determination of time-lapse differences, which may facilitate more efficient resource production and monitoring. Often, actual subsurface differences between geophysical surveys are relatively small, so small reductions in noise may substantially improve the detection of changes in subsea structures.

Overview of Noise Reduction Techniques

FIG. 4 is a block diagram illustrating an example system configured to reduce noise in time-lapse difference data, according to some embodiments. In the illustrated embodiment, the system includes difference module 420, adjustment module 430, estimate module 460, and difference module 465.

Difference module 420, in the illustrated embodiment, is configured to receive survey data representing different surveys (A and B in this example) and to generate a time-lapse difference (e.g., the data represented in FIG. 3). The time-lapse difference may be generated using any of various appropriate techniques, as well-understood by those skilled in the art. Different modules 420 may operate on migrated or unmigrated 3D seismic records, including stacked data volumes. Detected differences reflected in the time-lapse difference may include changes in amplitude of reflected signals or changes in timing of received signals, for example.

Estimate module 460, in the illustrated embodiment, receives data representing survey A and data representing the geometry exhibited during survey B. This geometry information may, for example, be generated by recording the positions of various elements of the survey array (e.g. sources and sensors) during the survey. The geometry information may specify locations of survey elements in multiple dimensions at different times. Estimate module 460 is configured to generate estimated sensor data based on the data from survey A, but modified based on the geometry of survey B. Said another way, the estimated sensor data is an estimate of sensor data that would have been captured by the first survey, had the second geometry been used during the first survey. In some embodiments, estimate module 460 implements Fourier reconstruction to generate this estimate, which may include performing a Fourier transform on the data to produce data in the frequency domain, adjusting the geometry, and performing an inverse Fourier transform to generate the estimated data in the time domain. Non-limiting example techniques for Fourier reconstruction are discussed in the following publications: Schonewille et al., *Seismic data regularization with the anti-alias anti-leakage Fourier transform*, First Break, Issue 9 Volume 27 (September 2009) and Xu et al., *Antileakage Fourier transform for seismic data regularization*, GEOPHYSICS 70: V87-V95 (2005).

Difference module 465, in the illustrated embodiment, receives the survey A data and the estimated sensor data for the survey B geometry and is configured to generate a noise model based on the difference between the two. FIG. 7A is discussed in further detail below and shows an example image corresponding to the noise model generated by module 465. As shown in FIG. 7A, the noise model may exhibit smile-shaped noise artifacts due to the differences in geometry.

Adjustment module 430, in the illustrated embodiment, receives the noise model and the time-lapse difference and is configured to generate an adjusted time-lapse difference, which may have reduced noise relative to the initial time-lapse difference. Adjustment module 430 may be configured to subtract the noise model from the time-lapse difference, for example. FIG. 8A, discussed in further detail below, shows an example adjusted time-lapse difference that exhibits reduced noise relative to the time-lapse difference of FIG. 3.

Example Multi-Model Noise Subtraction

FIG. 5 is a block diagram illustrating a more detailed example system configured to remove noise from time-lapse difference data, according to some embodiments. In the illustrated embodiment, the system includes migration modules 510A-D, difference module 520, difference modules 565A-B, and multi-model adaptive subtraction module 530. Module 530 may be "adaptive" in the sense that it attempts to match a noise model to noise present in time-lapse differences in order to remove matching signals.

In the illustrated embodiment, four sets of survey data 502, 504, 506, and 508 are shown. In some embodiments, survey data 502 and 504 are based on measurements by sensors during surveys on date A and date B, respectively. Survey data 506 represents an estimate of sensor data that would have been captured on date A using the survey array geometry of the survey that occurred on date B. Survey data 508 represents an estimate of sensor data that would have been captured on date B using the survey array geometry of the survey that occurred on date A. These estimates may be generated by applying Fourier reconstruction to the actual survey data from a given date based on the geometry from the other survey, as previously described, for example.

Migration modules 510, in the illustrated embodiment, are configured to receive survey data with various properties and to migrate the survey data according to any suitable known techniques. Migration is a well-understood concept in the field of geophysical surveys and involves re-locating seismic events in either space or time, e.g., to the location where the event occurred in the sub-surface rather than the location where it was recorded by a sensor. In the illustrated example, migration modules 510A and 510B provide their results to difference module 520 and also to a respective difference module 565A or 565B. Migration modules 510C and 510D provide their migration results to a respective difference module 565A or 565B as well.

Difference module 565A, in the illustrated example, generates noise model 512A based on the differences between migrated data 502 and migrated estimated data 506. Difference module 565B generates noise model 512B based on the differences between migrated data 504 and migrated estimated data 508. Note that while the noise models are generated post-migration in the embodiment of FIG. 5, noise models may be generated based on non-migrated data in other embodiments. Difference modules 565 may be configured similarly to difference module 465, as described above.

Difference module 520 may be configured similarly to difference module 420 described above. Difference module 520 generates a time-lapse difference 522 based on the differences between the actual survey data from the two surveys. For example, difference module 520 may subtract migrated survey A data from corresponding migrated survey B data, or vice versa, using various known techniques for generating a time-lapse difference. In other embodiments, the difference may be determined pre-migration.

Multi-model adaptive subtraction module 530, in the illustrated embodiment, is configured to generate an adjusted time-lapse difference 524 based on the time-lapse difference 522 and noise models 512A and 512B. Module 530 may detect matches between the noise models and the time-lapse difference 522 and subtract matching data from the time-lapse difference 522, for example. Speaking generally, module 530 may attempt to adjust the time-lapse difference to account for the generated noise models using any of various suitable techniques. For example, in some embodiments, module 530 applies least-squares matching of the respective noise models to the time-lapse difference and subtracts detected matching data from the time-lapse difference. In some embodiments, module 530 may use one or more other pattern matching techniques. Note that the system may transform the signals into various domains such as a curvelet domain or a Tau-P domain and perform matching of noise models and time-lapse data in one or more of such domains. Disclosed techniques may allow reduction in noise without removing differences in sensor data between surveys that are due to actual subsurface changes.

Note that the noise models and time-lapse difference information may be represented in various formats, and the noise models may be subtracted at one or more of various processing stages. Therefore, the noise reduction in a time-lapse difference using one or more noise models may receive various types of input data such as imaging output data, sensor data, etc., which may be stored using a variety of suitable data structures. In some embodiments, the system may apply different weighting factors to the plural noise models during a noise subtraction procedure, e.g., based on differences between noise characteristics of the two models. As one example, a noise model that is determined to be more similar to signals in the time-lapse difference may be weighted more heavily than another noise model that is determined to be less similar to signals in the time-lapse difference.

FIG. 6 is a flow diagram illustrating a method for reducing noise in time-lapse survey information, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, a computing system generates first estimated sensor data (e.g., data 506) based on sensor data from a first survey (e.g., data 502) but using geometry from a second survey. The estimated sensor data may also be described as simulated or adjusted sensor data. At 620, the computing system generates second estimated sensor data (e.g., data 508) based on sensor data from a second survey (e.g., data 504) but using geometry from a first survey.

At 630, in the illustrated embodiment, the system may migrate the sensor data from the first and second surveys and the first and second estimated sensor data, e.g., using migration modules 510. At 640, in the illustrated embodiment, the system determines a time-lapse difference (e.g., element 522) based on migrated sensor data from the first and second surveys. At 650, the system (e.g., difference modules 565) generates two noise models (e.g., models 512) based on comparison of sensor data from the first survey and the first estimated sensor data and comparison of sensor data from the second survey and the second estimated sensor data. Note that these noise models may be generated post-migration or pre-migration.

At 660, in the illustrated embodiment, the system adjusts the time-lapse difference based on the generated noise models, e.g., to remove noise signals from the time-lapse difference. To do so, the system may use, for example, the techniques described above in relation to module 530 and may generate an adjusted time-lapse difference such as difference 524.

At 670, in the illustrated embodiment, the system records the adjusted time-lapse difference in a tangible computer readable medium.

Example Noise Reduction Results

FIGS. 7A and 7B show noise models A and B, which were generated by applying the techniques of FIGS. 5-6 to the survey data shown in FIGS. 2A-2B. Noise model A in FIG. 7A corresponds to noise model 512A in FIG. 5. Similarly, noise model B in FIG. 7B corresponds to noise model 512B in FIG. 5. The noise models exhibit smile-shaped noise effects, which is an expected effect of differences in survey geometry between surveys A and B.

FIG. 8A illustrates an example adjusted time-lapse difference based on applying the noise models of FIGS. 7A and 7B. The example adjusted time difference in FIG. 8A corresponds to adjusted time difference 524 in FIG. 5. As can be seen, the smile-shaped noise effects are reduced relative to the time-lapse difference of FIG. 3, with the result that the adjusted time-lapse difference more accurately reflects actual subsea changes occurring between the times of the two surveys. FIG. 8B shows a comparison of corresponding portions of FIGS. 3 and 8A (showing expanded views of the dashed boxes in each figure) to more clearly illustrate the noise reduction in this example.

Example Method

Figure 9:
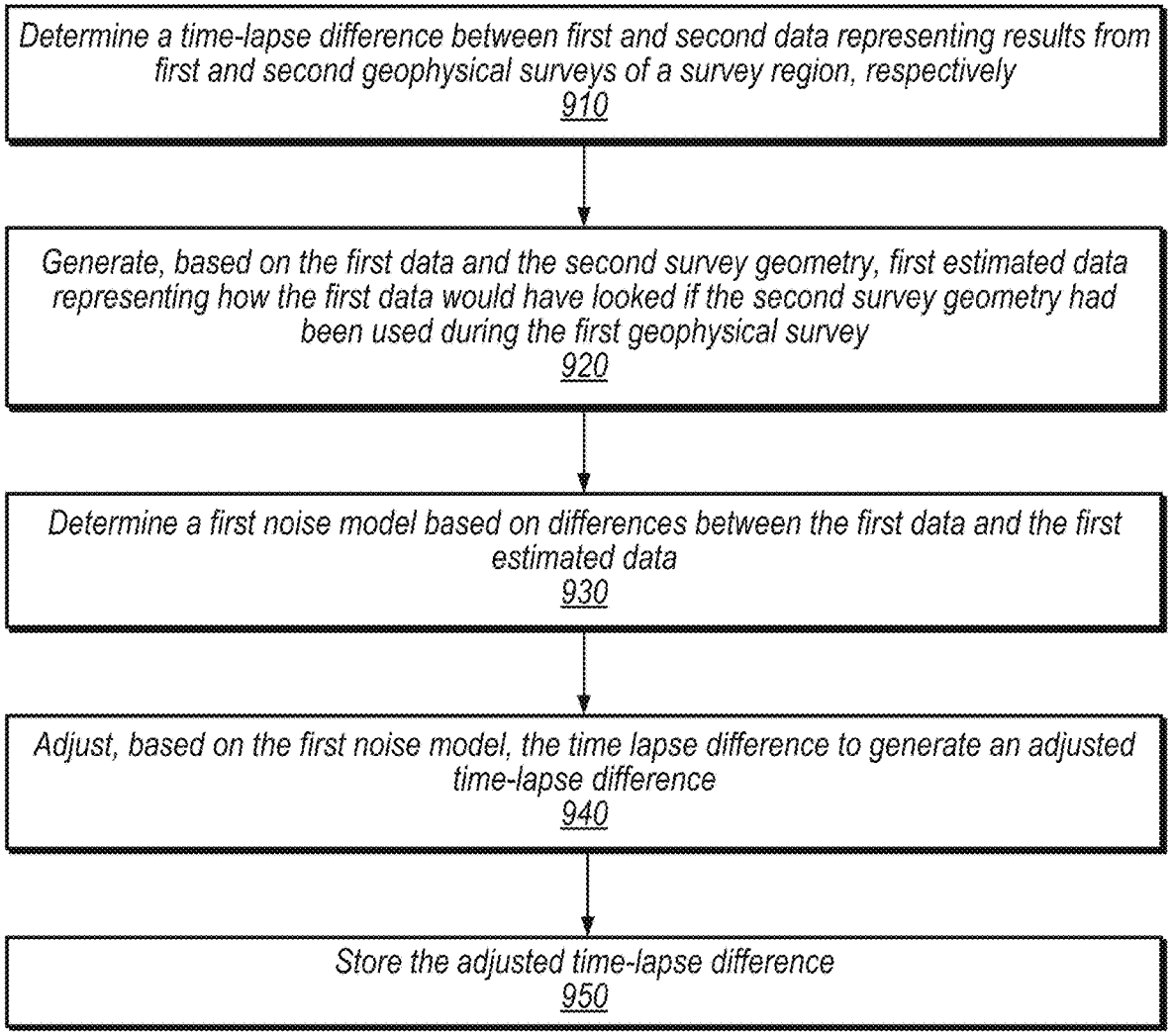
FIG. 9 is a flow diagram illustrating a more general example method for reducing noise in time-lapse difference measurements, according to some embodiments.

FIG. 9 is a flow diagram illustrating a method for reducing noise in time-lapse survey information, according to some embodiments. The method shown in FIG. 9 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 910, in the illustrated embodiment, a computing system determines a time-lapse difference between first and second data representing results from first and second geophysical surveys of a survey region, respectively. In some embodiments, the first and second surveys have respectively first and second survey geometries. Note that determining the time-lapse difference may include accessing previously-generated data specifying the time-lapse difference or generating the time-lapse difference, e.g., based on sensor data from different surveys. Further, use of the terms "first" and "second" to describe the surveys does not imply an ordering of the surveys; the first survey may occur after the second survey or vice versa.

In various embodiments, element 910 alone, in combination with the other operations of FIG. 9 or in combination with operations different from those illustrated in FIG. 9, corresponds to various means for determining a time-lapse difference between first and second data representing results from first and second geophysical surveys of a survey region, respectively. FIG. 4 element 420, FIG. 5 element 520, and FIG. 6 element 640 are also examples of such means.

At 920, in the illustrated embodiment, the system generates, based on the first data and the second survey geometry, first estimated data representing how the first data would have looked if the second survey geometry had been used during the first geophysical survey. In some embodiments, the system performs Fourier reconstruction on the first data according to the second survey geometry to generate the first estimated data. Note that survey geometries may most commonly vary in sensor or source positions in the cross-line direction when passing over a particular portion of the survey region, but the disclosed techniques may consider differences in geometries in various dimensions.

In various embodiments, element 920 alone, in combination with the other operations of FIG. 9 or in combination with operations different from those illustrated in FIG. 9, corresponds to various means for generating, based on the first data, first estimated data that would have been captured by the first survey, had a second survey geometry corresponding to the second survey been used. FIG. 4 element 460 and FIG. 6 element 610 are also examples of such means.

At 930, in the illustrated embodiment, the system determines a first noise model based on differences between the first data and the first estimated data. In some embodiments, the system migrates the first data and the first estimated data before determining the first noise model.

In various embodiments, element 930 alone, in combination with the other operations of FIG. 9 or in combination with operations different from those illustrated in FIG. 9, corresponds to various means for determining a first noise model based on differences between the first data and the first estimated data. FIG. 4 element 465 and FIG. 6 element 650 are also examples of such means.

In some embodiments, the system also determines a second noise model, e.g., noise model 512B of FIG. 5 if the first noise model corresponds to noise model 512A. In some embodiments, this includes generating, based on the second data and the first survey geometry, second estimated data representing how the second data would have looked if the first survey geometry had been used during the second geophysical survey, determining a second noise model based on differences between the second data and the second estimated data. In some embodiments, the adjusting of the time-lapse difference is based on both the first noise model and the second noise mode.

At 940, in the illustrated embodiment, the system adjusts, based on the first noise model, the time lapse difference to generate an adjusted time-lapse difference. In embodiments with multiple noise models, a multi-model adaptive subtraction module may consider multiple noise models for the adjustment. In some embodiments, the adjustment includes applying least-squares matching of the first and second noise models to the time-lapse difference and subtracting detected matching data from the time-lapse difference. In some embodiments, the adjustment uses different weighting factors for the first noise model than for the second noise model based on a determined difference in one or more noise characteristics between the first noise model and the second noise model.

In various embodiments, element 940 alone, in combination with the other operations of FIG. 9 or in combination with operations different from those illustrated in FIG. 9, corresponds to various means for adjusting, based on the first noise model, the time-lapse difference to generate an adjusted time-lapse difference. FIG. 4 element 430, FIG. 5 element 530, and FIG. 6 element 660 are also examples of such means.

At 950, in the illustrated embodiment, the system stores the adjusted time-lapse difference, for example in a tangible computer-readable medium. In some embodiments, the system may also generate an image representing the adjusted time-lapse difference for one or more sub-sea formations in the survey region. As discussed above, the disclosed techniques may improve the accuracy of such images.

Figure 10:
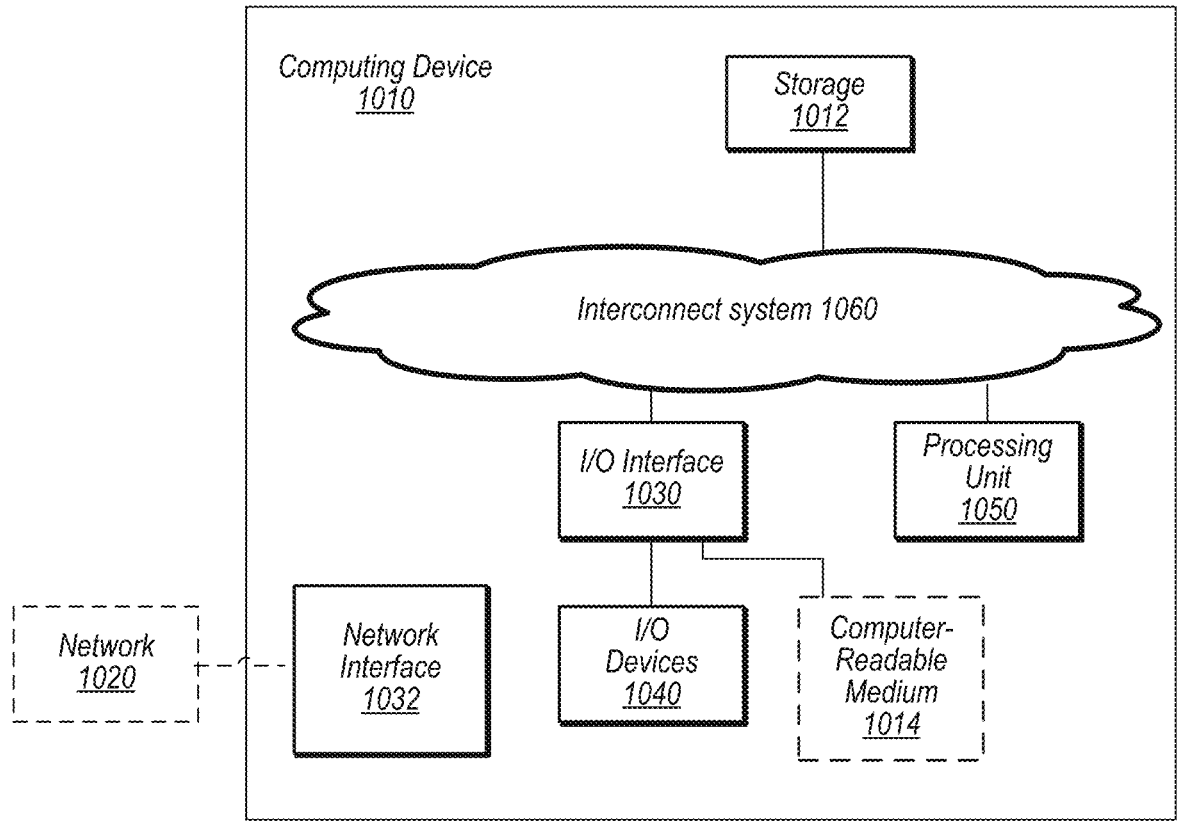
FIG. 10 is a block diagram illustrating an example computing system, according to some embodiments.

Various elements of FIG. 9 may provide a technical improvement of reducing noise in the time-lapse difference information caused by differences between the first and second survey geometries Example Computing Device Turning now to FIG. 10, a block diagram of one example computing device (which may also be referred to as a computing system) 1010 is depicted. One or more computing devices 1010 may be used to implement various portions of this disclosure. Computing devices 1010 may be any suitable type of computing device, including, but not limited to, a personal computer system, desktop computer, laptop or notebook computer, data center node, virtual machine, mainframe computer system, workstation, or network computer. As shown, computing device 1010 includes processing unit 1050, storage 1012, input/output (I/O) interface 1030 coupled via an interconnect system 1060 (e.g., a system bus or an I/O bus). I/O interface 1030 may be coupled to one or more I/O devices 1040. Computing device 1010 further includes network interface 1032, which may be coupled to network 1020 for communications with, for example, other computing devices.

In the illustrated embodiment, computing device 1010 further includes computer-readable medium 1014 as a possibly distinct element from storage subsystem 1012. For example, computer-readable medium 1014 may include non-transitory, persistent, tangible storage such as tape reels, hard drives, CDs, DVDs, flash memory, optical media, holographic media, or other suitable types of storage. In some embodiments, computer-readable medium 1014 may be physically separable from computing device 1010 to facilitate transport. In some embodiments, computer-readable medium 1014 may be used to manufacture a geophysical data product. For example, in some embodiments, seismic data (such as an adjusted time lapse difference 432 or 524 generated and recorded according to any one of various disclosed embodiments), or further processed versions of such seismic data, may be stored on computer-readable medium 1014, such as in steps 670 or 960, thereby completing manufacture of a geophysical data product. Although shown to be distinct from storage subsystem 1012, in some embodiments, computer-readable medium 1014 may be integrated within storage subsystem 1012.

In various embodiments, processing unit 1050 includes one or more processors. In some embodiments, processing unit 1050 includes one or more coprocessor units. In some embodiments, multiple instances of processing unit 1050 may be coupled to interconnect 1060. Processing unit 1050 (or each processor within 1050) may contain a cache or other form of on-board memory. In some embodiments, processing unit 1050 may be implemented as a general-purpose processing unit (e.g. a CPU or GPU), and in other embodiments it may be implemented as a special purpose processing unit (e.g., an ASIC). In general, computing device 1010 is not limited to any particular type of processing unit or processor subsystem.

As used herein, the terms "processing unit" or "processing element" refer to circuitry configured to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like. A processing unit may also be configured to execute program instructions from any suitable form of non-transitory computer-readable media to perform specified operations.

Storage subsystem 1012 is usable by processing unit 1050 (e.g., to store instructions executable by and data used by processing unit 1050). Storage subsystem 1012 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 1012 may consist solely of volatile memory in one embodiment. Storage subsystem 1012 may store program instructions executable by computing device 1010 using processing unit 1050, including program instructions executable to cause computing device 1010 to implement the various techniques disclosed herein.

I/O interface 1030 may represent one or more interfaces and may be any of various types of interfaces configured to couple to and communicate with other devices, according to various embodiments. In one embodiment, I/O interface 1030 is a bridge chip from a front-side to one or more back-side buses. I/O interface 1030 may be coupled to one or more I/O devices 1040 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. These articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations. Note that the various modules disclosed herein may be implemented by the same computing device or by different computing devices or systems.

This disclosure includes references to "one embodiment," "a particular embodiment," "some embodiments," "various embodiments," "an embodiment," etc. The appearances of these phrases do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "seismic source configured to emit seismic signals" is intended to cover, for example, a device that performs this function during operation, even if the device in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the context clearly dictates otherwise. Furthermore, the words "can" and "may" are used throughout this application in a permissive sense (i.e., having the potential to, being able to), not in a mandatory sense (i.e., must). The term "include," "comprise," and derivations thereof, mean "including, but not limited to." The term "coupled" means directly or indirectly connected.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. When used in the claims, the term "or" is used as an inclusive or and not as an exclusive or. For example, the phrase "at least one of x, y, or z" means any one of x, y, and z, as well as any combination thereof (e.g., x and y, but not z).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    determining, by a computing system, a time-lapse difference between first data and second data, the first data and the second data representing results from a first geophysical survey and a second geophysical survey of a survey region, respectively, and corresponding to a first survey geometry and a second survey geometry, respectively;
    generating, by the computing system based on the first data and the second survey geometry, first estimated data representing how the first data would have looked if the second survey geometry had been used during the first geophysical survey;
    determining, by the computing system, a first noise model based on differences between the first data and the first estimated data;
    adjusting, by the computing system based on the first noise model, the time-lapse difference to generate an adjusted time-lapse difference;
    generating one or more images or gathers representing the adjusted time-lapse difference for one or more subsea formations in the survey region, whereby changes in the one or more sub-sea formations are depicted more accurately by virtue of reduction in noise caused by differences between the first survey geometry and the second survey geometry; and
    storing the one or more images or gathers, or data representative thereof, in a tangible computer-readable medium.

2. The method of claim 1, wherein generating the first estimated data includes performing Fourier reconstruction on the first data according to the second survey geometry.

3. The method of claim 1, further comprising:
    generating, by the computing system based on the second data and the first survey geometry, second estimated data representing how the second data would have looked if the first survey geometry had been used during the second geophysical survey; and
    determining, by the computing system, a second noise model based on differences between the second data and the second estimated data; and
    wherein the adjusting is based on both the first noise model and the second noise model.

4. The method of claim 3, wherein the adjusting includes applying least-squares matching of the first noise model and the second noise model to the time-lapse difference and subtracting detected matching data from the time-lapse difference.

5. The method of claim 3, wherein the adjusting uses a different weighting factor for the first noise model than for the second noise model based on a determined difference in one or more noise characteristics between the first noise model and the second noise model.

6. The method of claim 1 wherein, for at least one survey element corresponding to both the first geophysical survey and the second geophysical survey, and for at least one portion of the survey region, data representing the first survey geometry and data representing the second survey geometry indicate different cross-line positions for the at least one survey element during transit over the at least one portion of the survey region.

7. The method of claim 6, wherein the at least one survey element is either a sensor or a source.

8. The method of claim 1, further comprising:
    migrating the first data, the first estimated data, and the second data;
    wherein determining the time-lapse difference is based on the migrated first data and the migrated second data; and
    wherein determining the first noise model is based on the migrated first data and the migrated first estimated data.

9. A non-transitory computer-readable medium having instructions stored thereon that are executable by a computing device to perform operations comprising:
  determining a time-lapse difference between first data and second data, the first data and the second data representing results from a first geophysical survey and a second geophysical survey of a survey region, respectively, and corresponding to a first survey geometry and a second survey geometry, respectively;
  generating, based on the first data and the second survey geometry, first estimated data representing how the first data would have looked if the second survey geometry had been used during the first geophysical survey;
  determining a first noise model based on differences between the first data and the first estimated data;
  adjusting, based on the first noise model, the time-lapse difference to generate an adjusted time-lapse difference;
  generating one or more images or gathers representing the adjusted time-lapse difference for one or more sub-sea formations in the survey region, whereby changes in the one or more sub-sea formations are depicted more accurately by virtue of reduction in noise caused by differences between the first survey geometry and the second survey geometry; and
  storing the one or more images or gathers, or data representative thereof.

10. The non-transitory computer-readable medium of claim 9, wherein generating the first estimated data includes performing Fourier reconstruction on the first data according to the second survey geometry.

11. The non-transitory computer-readable medium of claim 9, wherein the operations further comprise:
  generating, based on the second data and the first survey geometry, second estimated data representing how the second data would have looked if the first survey geometry had been used during the second geophysical survey; and
  determining a second noise model based on differences between the second data and the second estimated data; and
  wherein the adjusting is based on both the first noise model and the second noise model.

12. The non-transitory computer-readable medium of claim 11, wherein the adjusting includes applying least-squares matching of the first noise model and the second noise model to the time-lapse difference and subtracting detected matching data from the time-lapse difference.

13. The non-transitory computer-readable medium of claim 11, wherein the adjusting uses a different weighting factor for the first noise model than for the second noise model based on a determined difference in one or more noise characteristics between the first noise model and the second noise model.

14. The non-transitory computer-readable medium of claim 9, wherein:
  for at least one survey element corresponding to both the first geophysical survey and the second geophysical survey, and for at least one portion of the survey region, data representing the first survey geometry and data representing the second survey geometry indicate different cross-line positions for the at least one survey element during transit over the at least one portion of the survey region.

15. The non-transitory computer-readable medium of claim 14, wherein the at least one survey element is either a sensor or a source.

16. The non-transitory computer-readable medium of claim 9, wherein the operations further comprise:
  migrating the first data, the first estimated data, and the second data;
  wherein determining the time-lapse difference is based on the migrated first data and the migrated second data; and
  wherein determining the first noise model is based on the migrated first data and the migrated first estimated data.

17. In a process of the kind in which a computing system is used to generate a time-lapse difference between results corresponding to a first geophysical survey and results corresponding to a second geophysical survey over a survey region, wherein first data represent the results from the first geophysical survey and second data represent the results from the second geophysical survey, the improvement comprising:
  accessing, by the computing system, data representing a second survey geometry corresponding to the second geophysical survey and data representing a first survey geometry corresponding to the first geophysical survey;
  generating, by the computing system based on the first data and the data representing the second survey geometry, first estimated data representing how the first data would have looked if the second survey geometry had been used during the first geophysical survey;
  determining, by the computing system, a first noise model based on differences between the first data and the first estimated data;
  adjusting, by the computing system based on the first noise model, the time-lapse difference to generate an adjusted time-lapse difference, thereby reducing noise in the time-lapse difference caused by differences between the first survey geometry and the second survey geometry; and
  generating one or more images or gathers representing the adjusted time-lapse difference for one or more sub-sea formations in the survey region, whereby changes in the one or more sub-sea formations are depicted more accurately by virtue of the reduction in noise caused by differences between the first survey geometry and the second survey geometry.

18. The process of claim 17, further comprising:
  generating, by the computing system based on the second data and the data representing the first survey geometry, second estimated data representing how the second data would have looked if the first survey geometry had been used during the second geophysical survey; and
  determining, by the computing system, a second noise model based on differences between the second data and the second estimated data; and
  wherein the adjusting is based on both the first noise model and the second noise model.

19. The process of claim 17, wherein generating the first estimated data includes performing Fourier reconstruction on the first data according to the data representing the second survey geometry.

20. Apparatus for generating a time-lapse difference between results of a first geophysical survey and results of a second geophysical survey of a survey region, comprising:
  means for determining a time-lapse difference between first data representing the results of the first geophysical survey and second data representing the results of the second geophysical survey;
  means for accessing data representing a second survey geometry corresponding to the second geophysical survey;

means for generating, based on the first data and the data representing the second survey geometry, first estimated data representing how the first data would have looked if the second survey geometry had been used during the first survey;

means for determining a first noise model based on differences between the first data and the first estimated data;

means for adjusting, based on the first noise model, the time-lapse difference to generate an adjusted time-lapse difference; and means for generating one or more images or gathers representing the adjusted time-lapse difference for one or more sub-sea formations in the survey region, whereby changes in the one or more sub-sea formations are depicted more accurately by virtue of reduction in noise caused by differences between the first survey geometry and the second survey geometry.

* * * * *